June 15, 1965

E. MORF 3,188,793

SEALING DEVICE FOR A CONTROL PUSHER PASSAGE THROUGH A CASING WALL

Filed Feb. 10, 1964

Inventor
Ernest Morf
By Stevens, Davis, Miller & Mosher
Attorneys

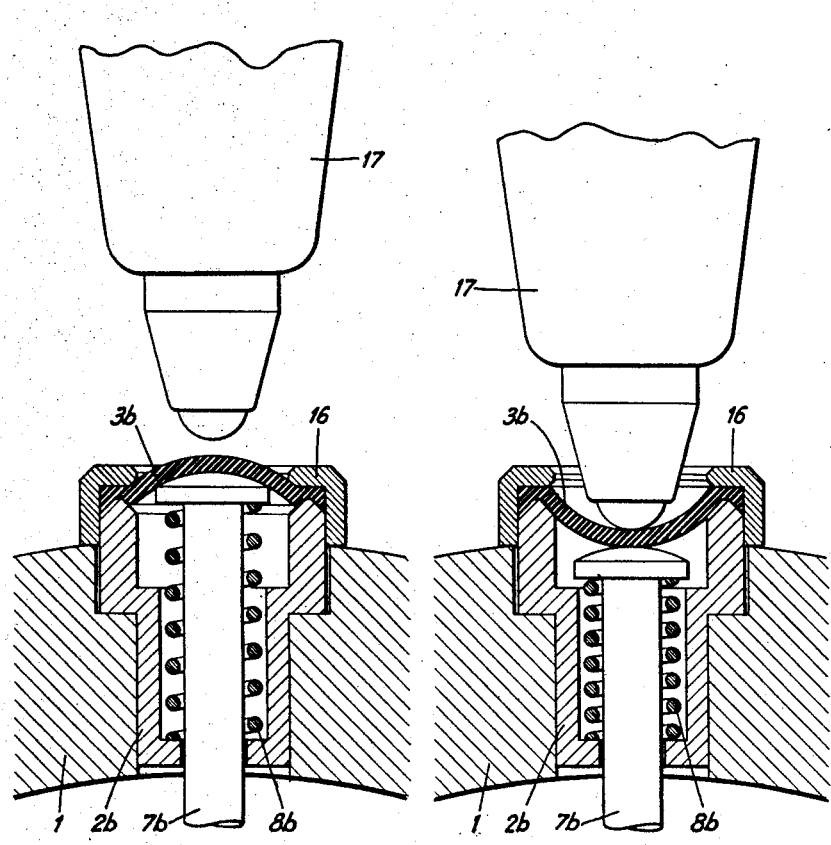

United States Patent Office 3,188,793
Patented June 15, 1965

3,188,793
SEALING DEVICE FOR A CONTROL PUSHER PASSAGE THROUGH A CASING WALL
Ernest Morf, Vaudijon, Colombier, Switzerland
Filed Feb. 10, 1964, Ser. No. 343,822
Claims priority, application Switzerland, Feb. 12, 1963,
1,722/63
9 Claims. (Cl. 58—90)

This invention relates to the sealing devices provided for tightly closing the passage of a control pusher through the wall of a casing, in particular of a time piece casing.

With the sealing devices known in the art and in particular in the watch making art no difference has been made as yet between the sealing devices provided for tightly closing the passage of the winding and hand-setting stem through the casing wall and the sealing devices provided for tightly closing the passages of the control pushes as for instance those used for controlling a chronograph, a calendar watch mechanism or any further particular watch or instrument mechanism, although the conditions under which a control pusher has to operate are far from those under which the winding and hand-setting stem operates. Whereas the winding and hand-setting stem has two different control positions, which are spaced apart from each other in axial direction and in which the stem has to be brought either by pushing or by pulling and in which this stem has to be rotatable in either direction, the pushers have only one control position in which they moreover need not be rotatable. A control pusher thus usually remains in a resting position in which it does not perform any function and it can be brought by pushing into its control position. When the pusher is then released, a return spring urges it back into its resting position.

In spite of these great differences between the mode of operation of a control pusher and of the winding and hand-setting stem, the watchmakers have used the usual sealing means of the stem passage every time they had to seal a pusher passage.

Since the winding and hand-setting stem has to transmit a rotary motion from the crown fixed thereon to the winding and hand-setting mechanism of the watch, the usual sealing devices provided for the passage of the winding and hand-setting stem comprise an annular sealing gasket. This gasket is more or less strongly pressed between two cylindrical coaxial surfaces. One of these surfaces belongs either to the stem or to a member moving therewith and the other one of said surfaces lies on the casing or a member secured thereto. As a consequence thereof, one of said surfaces can both rotate and move axially with respect to the other one. Using now a similar annular gasket for tightly closing a pusher passage involves resorting either to an extremely strong return spring or to a sealing gasket which is not strongly compressed between the cylindrical surfaces in question thus providing for a seal of the pusher passage which is not as tight as that of the winding and hand-setting stem passage.

A spring which has been chosen strong enough in order to overbalance the friction of such a gasket on the movable pusher part may become weaker in use. The gasket friction may also increase. In both cases the pusher would remain in its controlling position even after it would have been released. It is therefore an object of this invention to provide a sealing device which is specifically arranged for the control pushers. This new sealing device shall ensure an absolutely tight closure of the passages provided through the casing walls for these pushers without necessitating a stronger return spring than the pushers having no sealing means associated therewith.

The sealing device according to the invention is characterized by a lid member which fully obturates the passage provided through the casing wall for the control pusher and which is flexible enough in order to be able to participate to the axial displacements of the pusher.

In a preferred embodiment of the sealing device improved according to the invention the lid member has its periphery tightly anchored to a tube fixed to the casing wall and constituting the pusher passage.

A pusher, for instance a chronograph pusher, which is frequently actuated, will preferably comprise an outer part, which is accessible from outside the casing, and an inner part, which transmits the inward displacements of the outer part to a device located within the casing, both pusher parts being located on either side of the lid member. In such an embodiment of the improved sealing device the two pusher parts can be held permanently in contact with the lid member by a return spring acting on the inner pusher part. The lid member can, however, also be made out of a stretchable material as resilient as rubber so that the lid member may work as return spring and urge the pusher into its resting position after this pusher has been actuated.

Three embodiments of the sealing device according to the invention are represented diagrammatically and by way of example in the accompanying drawing.

In the drawing:

FIGS. 4 and 5 are sectional views similar to those of FIGS. 1 and 2, respectively, but showing the third embodiment.

Figure 1:
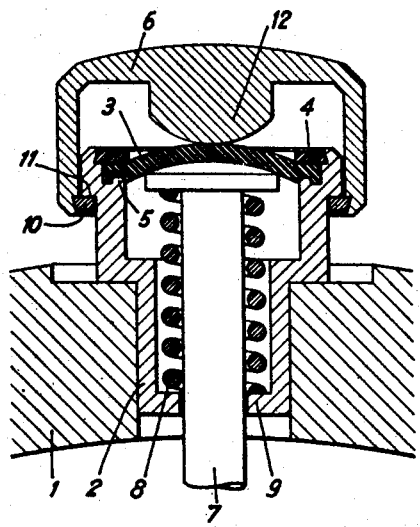
FIG. 1 is an axial section of the first embodiment, the pusher with which the sealing device is associated being in resting position.
Figure 2:
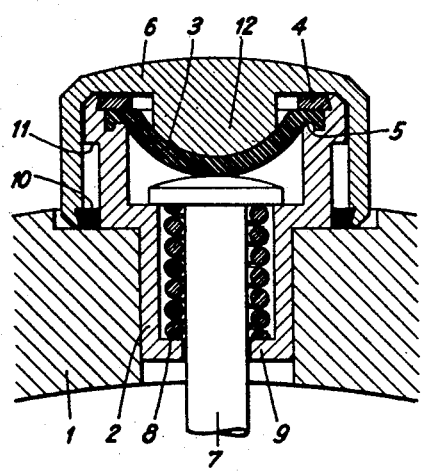
FIG. 2 is a sectional view similar to that of FIG. 1, but showing the pusher in its control position.

The pushers represented in FIGS. 1 and 2 serve to control upon pressing on said pusher from outside the casing 1, a mechanism (not shown) located within this casing. The passage of the pusher through the wall of casing 1 is ensured by a tube 2 tightly secured to the wall of casing 1, within an opening provided therethrough. The passage constituted by tube 2 is tightly closed by a lid member 3 which fully obturates the outer end of tube 2. This lid member consists of a thin membrane of plastics having its periphery tightly anchored to tube 2 by means of a ring 4 set in an appropriate lodging of tube 2. An annular projection 5 of tube 2 provides for a rigid anchorage of lid member 3. In its natural state, i.e. before having been fixed to tube 2, lid member 3 is domed.

The pusher itself comprises an outer part 6, which is accessible from outside the casing, and an inner part 7, which transmits to the mechanism located within the casing 1 the displacements of part 6 occurring upon pressing thereon. As shown in the drawing the two pusher parts 6 and 7 are located on either side of lid member 3. A return spring 8 mounted within tube 2 and bearing on an inner shoulder 9 of this tube moreover acts on the inner part 7 of the pusher and tends to maintain the same in its resting position shown in FIG. 1, in which a ring 10 set in a lodging provided in the outer part 6 of the pusher bears on a shoulder 11 of tube 2. In this position a head portion of the inner pusher part 7 is in contact with the middle section of lid member 3 and presses the same against a central projection 12 of pusher part 6. Ring 10 and shoulder 11 accordingly constitute stop means which limit the pusher displacement occurring under the action of the return spring 8. In the position of FIG. 1 the lid member 3 is slightly bulged and has its convex surface turned outside tube 2. Upon pressing on the outer pusher part 6, this pusher part comes in the position represented in FIG. 2, in which lid member 3 is bulged so as to have its convex surface turned inside tube 2. By moving from the position of FIG. 1 towards that shown in FIG. 2 the outer pusher part 6 causes the inner pusher part 7 to move similarly. As soon as the pusher is released the return spring 8 causes the inner pusher part 7 and accordingly the lid member 3 and the outer pusher part 6 to move back into the position of FIG. 1.

The pusher described thus operates in the same manner as the pushers known in the art, which comprise a single compact unit. The lid member 3 which fully obturates the pusher passage participates to the pusher displacements since its middle section truly follows these displacement. Moreover, since the portion of lid member 3 anchored to tube 2 is located between the outmost positions of the central section of the lid member, the latter only opposes negligible resistance to spring 8 which can accordingly be chosen as with the pushers having no sealing devices associated therewith.

Figure 3:
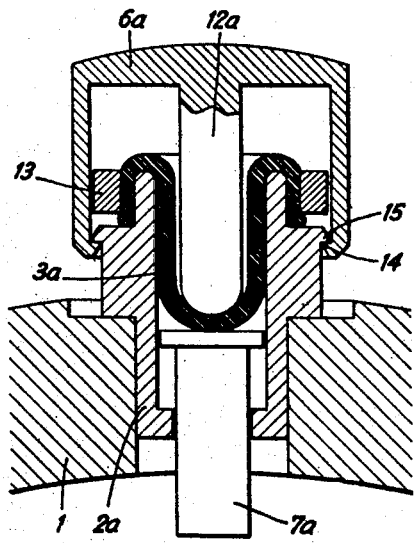
FIG. 3 is a sectional view similar to that of FIG. 1, but showing the second embodiment.

The second embodiment represented in FIG. 3 differs from the first on substantially in that the operation of the return spring described in the first embodiment is ensured in the second embodiment by the lid member 3a itself, which obturates the pusher passage. In this second embodiment the lid member 3a consists of a membrane made out of a resiliently stretchable material. This lid member has also its peripheral portion anchored by means of a ring 13 to a tube 2a tightly fixed to casing 1 so that lid member 3a fully obturates the outer end of tube 2a. The stop means, which determine the resting position of the pusher, are constituted in this embodiment by an inner rim 14 of the outer pusher part 6a and by an outer rim 15 of tube 2a. In this second embodiment the outer pusher part 6a is also provided with a central projection 12a which is, however, substantially longer than the similar projection of the first embodiment. This pusher projection thus stretches lid member 3a towards the inner end of tube 2a. When the pusher is in resting position, the lid member 3a is already in stretched condition. In other words, lid member 3a has already been stretched out to some extent when the pusher is in resting position, so that the lid member exerts a pressing action on the outer pusher part 6a, thus holding the rims 14 and 15 in contact with each other. Upon moving the outer pusher part 6a towards the inner space of casing 1, the lid member 3a is stretched even more within tube 2a while pushing the pusher inner part 7a into casing 1. Upon releasing the pusher, the lid member 3a urges the pusher outer part 6a into the position represented in the drawing. As regards the inner pusher part 7a, it does not necessarily remain always in contact with lid member 3a. Since this inner pusher part is freely mounted within tube 2a, it is the mechanism mounted in casing 1 and controlled by the pusher represented, which has to urge the inner pusher part 7a outwards after the pusher has been released. With this second embodiment the two pusher parts 6a and 7a thus do not move identically; the middle section of lid member 3a nevertheless truly follows the displacements of the outer pusher part 6a so that the lid member also participates to the displacements of the pusher in this embodiment.

The pusher represented in FIGS. 4 and 5 serves as corrector for the date indicating member in a calender watch. Its passage through the wall of casing 1 is also ensured by a tube 2b tightly secured to casing 1. The outer end of this passage is fully obturated by a lid member 3b similar to that of the first embodiment. Lid member 3b has its periphery anchored to tube 2b by a ring 16. The pusher itself exclusively consists of a piece 7b held within tube 2b by lid member 3b. This pusher piece 7b is moreover held in contact with the middle section of lid member 3b by a return spring 8b.

At rest the pusher is in the position represented in FIG. 4. To actuate this pusher and to carry out a correction of the position of the date indicating member, the tip of a ball pen 17 or of a pencil or of any further usual instrument of common use having a similar tip can be used as shown in the drawing. It suffices therefore to press on the central section of lid member 3b as shown in FIG. 5. Upon releasing the pusher, the spring 8b urges piece 17 and lid member 3b into the position represented in FIG. 4.

The pusher tube of this third embodiment could also be fully set within the wall of casing 1 so that lid member 3b would be flush with the outer surface of the casing wall. By comparing this third embodiment to the two first ones, it will be noted that this last embodiment does not disturb the aesthetic appearance of the casing. The pusher portion protruding from the casing in this third embodiment is indeed substantially smaller than that of a pusher comprising an outer member extending over the tube part protruding from the casing.

The fact that the pusher of this third embodiment cannot be actuated by the fingers does not constitute a drawback since the date indicating member of a calendar watch has under normal circumstances only to be corrected at the end of a month having less than thirty-one days.

I claim:

1. A control pusher unit for controlling a mechanism enclosed in a casing from outside the casing by pressing impulses only, comprising a tubular housing provided both with an outer fitting surface adapted for setting with force fit said tubular housing in a boring provided through the wall of a casing, and with an inner surface surrounding an inner passageway, a pusher member carried by said tubular housing and shiftable with respect thereto along the axis thereof, and a lid member extending across the inner passageway of said tubular housing and having a peripheral portion, said peripheral portion being tightly anchored to said tubular housing so as to completely obturate the inner passageway thereof.

2. A control pushed unit according to claim 1 wherein said tubular housing has an inwardly directed shoulder at the end nearest the interior of the casing, said pusher member having an outwardly directed shoulder at the end towards said lid member, a spring member positioned between said shoulders whereby said pusher member will be returned to its outermost position upon removal of pressure from said lid member.

3. A control pusher unit according to claim 1 wherein said pusher member comprises an inner pusher member shiftably mounted in said tubular housing and guided by an inner bearing surface thereof, and an outer pusher member shiftably mounted on said tubular housing and guided by an outer bearing surface thereof, said pusher members being located on either side of the lid member.

4. A control pusher unit according to claim 3 wherein said tubular housing is provided with an inwardly directed shoulder at its inner end and an outwardly directed shoulder at its outer end, said inner pusher member having an outwardly directed shoulder at the end towards the lid member, spring means positioned between the shoulder of said pusher member and said inwardly directed shoulder of said tubular housing for returning said inner pusher to its outwardmost position, said outer pusher having an inwardly directed shoulder at the end towards the casing whereby said outer pusher is retained on said tubular casing.

5. A control pusher unit according to claim 4 wherein said lid member is anchored to said tubular housing at the outermost portions of said peripheries.

6. A control pusher unit according to claim 1 in which the lid member is anchored to the tubular housing at a place located between the outmost positions in which the middle section of the lid member comes to be when the pusher is at rest and when it is depressed.

7. A control pusher unit according to claim 1 in which the lid member consists of a preformed domed-shaped plastic membrane.

8. A control pusher unit according to claim 5 in which the lid member consists of a preformed domed-shaped plastic membrane.

9. A control pusher unit according to claim 6 in which the lid member consists of a preformed domed-shaped plastic membrane.

References Cited by the Examiner

UNITED STATES PATENTS 2,582,706   1/52   Kudelski _____ 58—90

LEYLAND M. MARTIN, *Primary Examiner.*